United States Patent
Matsumoto et al.

(10) Patent No.: US 6,660,986 B2
(45) Date of Patent: Dec. 9, 2003

(54) INFORMATION READING AND RECORDING APPARATUS FOR RECORDING MEDIA

(75) Inventors: Kozo Matsumoto, Iwata-gun (JP); Atsushi Kitamura, Iwata-gun (JP); Motoji Egawa, Iwata-gun (JP)

(73) Assignee: Minebea Co., Ltd., Kitasaku-gun (JP)

(*) Notice: Subject to any disclaimer, the term of this patent is extended or adjusted under 35 U.S.C. 154(b) by 39 days.

(21) Appl. No.: 10/026,632

(22) Filed: Dec. 27, 2001

(65) Prior Publication Data

US 2002/0084405 A1 Jul. 4, 2002

(30) Foreign Application Priority Data

Dec. 28, 2000 (JP) ........................................ 2000-401788

(51) Int. Cl.$^7$ .................. G02B 27/40; G02B 27/64; G02B 7/04
(52) U.S. Cl. ................ 250/201.5; 250/216; 369/112.01
(58) Field of Search .............................. 250/208.1, 226, 250/216, 227.19, 227.2, 566, 201.5, 234, 559.4, 559.44; 382/254, 260, 262; 369/43, 44.11, 44.26, 44.33, 44.14, 94, 112.1, 112.01, 10.22

(56) References Cited

U.S. PATENT DOCUMENTS

| | | | | |
|---|---|---|---|---|
| 5,291,012 A | * | 3/1994 | Shimizu et al. ............. | 250/216 |
| 5,450,376 A | * | 9/1995 | Matsumura et al. ...... | 369/13.32 |
| 5,590,110 A | * | 12/1996 | Sato ....................... | 369/112.03 |
| 5,625,613 A | * | 4/1997 | Kato et al. ............. | 369/112.15 |
| 5,835,469 A | * | 11/1998 | Maeda et al. ................ | 369/100 |
| 5,923,636 A | * | 7/1999 | Haruguchi et al. .... | 369/112.12 |
| 5,966,354 A | * | 10/1999 | Takahashi et al. ....... | 369/44.27 |

* cited by examiner

*Primary Examiner*—David Porta
*Assistant Examiner*—Patrick J. Lee
(74) *Attorney, Agent, or Firm*—Oliff & Berridge, PLC

(57) ABSTRACT

An information reading and recording apparatus in which recording media having respective recording densities different front each other, such as DVD, CD, CD-R/RW and the like, can be compatibly read and recorded only with a low-cost laser diode for low recording density. A laser beam from the laser diode is passed through a collimator lens via a half mirror, and there is provided a reflecting mirror for introducing the laser beam to one of two objective lenses, from which the laser beam is emitted towards the disk. One of the objective lenses is a lens having a high numerical aperture and the other one is a lens having a low numerical aperture. A super-resolution cut-off filter is disposed immediately before the objective lens having a high numerical aperture so that the objective lens and the super-resolution cut-off filter are placed in the optical path on reading DVD. On reading CD, the other lens is placed in the optical path. The laser beam reflected from the disk is received by a photo-detector for converting it into an electrical signal.

5 Claims, 11 Drawing Sheets

INFORMATION READING AND RECORDING APPARATUS FOR RECORDING MEDIA

BACKGROUND OF THE INVENTION

1. Field of the Invention

The present invention relates to an information reading and recording apparatus for recording media, such as an optical disk or the like used in an optical disk drive.

2. Description of the Related Art

Currently, in information input/output apparatuses using light, readout of information is performed by producing a recording pit by converging light emitted from a laser beam source on a track groove provided on the disk-shaped recording medium such as a CD (compact disk), as a micro spot, recording the presence or the absence of the pit as information, and then irradiating the track with the micro spot to detect the presence or absence of the pit on the track by reflected light.

Recently, DVDs (digital video disks) having a recording capacity of about 7 times that of CDs have become widely used to meet the demand for increased recording capacity. Increase in recording capacity means improvement of the recording density, which depends upon the number of recording pits that can be formed on the recording medium (hereinafter referred to as a disk). In DVDs, decreasing the size of the recording pit, that is, decreasing the diameter of the spot of light irradiated on the disk is one of the factors in increasing the density. The size of the spot to be irradiated on the disk is proportional to the wavelength of the laser and is inversely proportional to the numerical aperture of the objective lens. Accordingly, for decreasing the size of the recording pit, it is required to shorten the wavelength of the laser and to increase the numerical aperture of the objective lens.

However, DVDs are strongly required to be compatible with CDs from the viewpoint of backward comparability of software. Originally, an optical head device was provided with one laser beam source with a wavelength of 635–650 nm and one objective lens having a numerical aperture of about 0.6 for DVDs and another laser beam source with a wavelength of 780 nm and another objective lens having a numerical aperture of about 0.45 for CDs so as to maintain the compatibility between the both disks.

However, when the numerical aperture of the objective lens is increased, the convergence state of the light beam deteriorates due to coma aberration with respect to the inclination of the optical disk. Since coma aberration is proportional to the third power of the numerical aperture of the objective lens and to the thickness of the disk protection substrate, DVDs are designed to have a disk protection substrate with a thickness of 0.6 mm, which is half that of CDs.

When the thickness of the substrate deviates from the designed value, the position where light passing through the inward portion of the objective lens converges deviates from the position where light passing through the outward portion thereof converges depending on spherical aberration. Therefore, when a CD is read by the use of an objective lens having a numerical aperture of 0.6, which is optimally designed for the thickness of the substrate of a DVD, it is necessary to correct spherical aberration by limiting the luminous flux in the outward portion incident on the lens or by slightly diverging the incident angle at the lens.

Accordingly, while one objective lens can be used commonly for the DVD and the CD with the necessary correction of spherical aberration, two laser beam sources each having a different wavelength from other have to be provided for compatibility with a write-once CD. This is because the reflective recording layer of the write-once CD is formed of an organic dye material and thus has a reflection coefficient as low as 6% for light beam having a wavelength of 635–650 nm, that is a wavelength appropriate to the DVD.

Thus, since the current DVD optical head apparatus is equipped with two laser beam sources respectively with a wavelength of 635–650 nm for the DVD and a wavelength of 780 nm for the CD, and since light beams from the two light sources are to be guided to the two objective lenses thereby requiring additional parts such as a prism, aperture control means, or the like for respective light beams, down-sizing and cost reduction of the apparatus are very difficult to realize.

In order to solve the problems described above, various optical pickup apparatuses shown in FIG. 9 to FIG. 12 have been proposed. Following is an outline of the conventional optical pickup apparatuses.

FIG. 9 is a block diagram of a first conventional example, which includes laser beam sources 91 and 12 to emit laser beam with a wavelength of 650 nm for the DVD and a wavelength 780 nm for the CD, respectively, and a wavelength selection prism 92 for making the respective laser beams travel along the same optical path. There is provided a half mirror 11 for reflecting and guiding the laser beam to a collimating lens 13 and also for passing therethrough and guiding to a photo-detector 90 the laser beam reflected at a disk 18 and returning therefrom. There is also provided a reflection mirror 15 for directing to an objective lens 16 or 17 the laser beam having passed through the collimating lens 13 so that the laser beam is guided from the objective lens 16 or 17 to the disk 18. The disk 18, that is, the DVD or the CD, is placed on a drive mechanism (not shown) according to the application, and is rotated by the drive mechanism.

The objective lens 16 has a high numerical aperture (high NA) for DVDs, and the objective lens 17 has a low numerical aperture (low NA) for CDs. The drive mechanism (not shown) is adapted to switch between the objective lens for the DVD and that for the CD.

The laser beam reflected at and returning from the disc 18 passes through the half mirror 11 and is received by the photo-detector 90 that converts it into an electrical signal.

FIGS. 8A to 8C are explanatory drawings of the wavelength selection prism 92 above described. The wavelength selection prism 92 is provided with an optical path control film 80 having characteristics shown in FIG. 8C. The optical path control film 80 characteristically blocks light having a wavelength of 700 nm or below and allows light having a wavelength of 750 nm or above to pass through. Therefore, while light 81 with a wavelength of 780 nm incident on the optical path control film 80 is not blocked by the optical path control film 80 and thus travels straight through as shown in FIG. 8A, light 82 with a wavelength of 650 nm incident on the optical path control film 80 from the orthogonal direction to the light 81 is blocked by the optical path control film 80 and reflected by 90 degrees to be directed along the same optical path as the light 81 with a wavelength of 780 nm, as shown in FIG. 8B.

The operation of the optical pickup apparatus shown in FIG. 9 is described below. A laser diode (wavelength; 650 nm) 91 for DVDs and another laser diode (wavelength: 780 nm) 12 for CDs, as light sources, are disposed orthogonal to each other so that respective light beams are guided into the same optical path by the wavelength selection prism 92. Then, the optical axis of the light beam is reflected by 90 degrees at the half mirror 11, and the light beam is converted into a parallel pencil by the collimating lens 13. The light beam formed in a parallel pencil is directed by the reflection mirror 15 toward the surface of the disk 18 where a recording layer exists, thereby made incident on the objective lens 16 or 17.

A suitable objective lens between the objective lens 16 with a high NA for DVDs and the objective lens 17 with a low NA for CDs is selected, switched and set in place by the drive mechanism (not shown). When reading an DVD, the laser diode 91 for DVDs oscillates, and the objective lens 16 with a high NA for DVDs is placed in the optical path to converge the light beam onto a disk (DVD) 18a. When reading a CD, the laser diode 12 for CDs oscillates and the objective lens 17 with a low NA for CDs is placed in the optical path to converge the light beard onto a disk (CD) 18b. The above-described switching mechanism is incorporated into an axial-displacement-type actuator apparatus (not shown).

The light beam reflected at each disk starts traveling in the backward direction along the same path, passes through the half mirror 11, and is directed to the photo-detector 90 to be converted into an electrical signal.

FIG. 10 is a block diagram of a second conventional example, in which laser diodes for DVDs and CDs and a photo-detector are packaged into an enclosure thereby constituting an integrated laser unit, thus making it possible to reduce the number of components in comparison with the first conventional example. In other words, an integrated laser unit 201 for CDs includes a laser beam source with a wavelength of 780 nm appropriate for CDs and a photo-detector for CDs integrated therein, and an integrated laser unit 202 for DVDs includes a laser beam source with a wavelength of 650 nm appropriate for DVDs and a photo-detector for DVDs integrated therein.

Laser beams from the integrated laser unit 201 for CDs and from the integrated laser unit 202 for DVDs are each emitted toward the wavelength selection prism 92. The function of such an optical pickup apparatus is the same as that of the first conventional example shown in FIG. 9, and thus the explanation thereof is omitted.

FIG. 11 is a block diagram showing a third conventional example which differs from the first conventional example in that there are provided: an aperture control filter 103 disposed immediately before the objective lens 16; a wavelength selection prism 92 for separating laser beams reflected at the disk and returning therefrom according to the wavelength of the laser beams; and two photo-detectors 101 and 102 for receiving the respective laser beams from the wavelength selection prism 92. Here, the photo-detector 101 is for CDs and the photo-detector 102 is for DVDs.

FIG. 6 is an explanatory drawling of the above-described aperture control filter 103. The aperture control filter 103 is structured such that a plate glass 60 has an anti-reflection coating 31 of a multi-layer film formed entirely on one face and at the central circular portion of the other face, and has a wavelength selection film 61 formed at the rest of the other face where the anti-reflection coating film 31 is not formed.

FIG. 7 is a graph illustrating the relationship between wavelength and transmittance in the wavelength selection film 61 used in the aperture control filter 103. As clearly seen in FIG. 7, the transmittance decreases for wavelengths from 725 nm upward. This means the laser beam with a wavelength of 780 nm appropriate for CDs is reflected on the wavelength selection film 61.

The operation of the optical pickup apparatus shown in FIG. 11 is described below. The laser diode 91 (wavelength: 650 nm) for DVDs and the laser diode 12 (wavelength; 780 nm) for the CDs, as light sources, are disposed orthogonal to each other so that respective laser beams are introduced into the same optical path by a wavelength selection prism 92. Then, the laser beam has its optical axis deflected by 90 degrees at the half mirror 11, and is converted into a parallel pencil by the collimating lens 13. The light beam in the form of a parallel pencil is directed by the reflection mirror 15 toward the surface of the disk 18 where recording layer exists to be made incident on the objective lens 16 via the aperture control filter 103 provided immediately before the objective lens 16. The function of the objective lens 16 is the same as that of FIG. 9 and thus the description thereof will be omitted.

As described above, the aperture control filter 103 has different optical characteristics between at the central circular portion and at the surrounding portion. While the surrounding portion transmits a laser beam with a wavelength of 650 nm and reflects a laser beam with a wavelength of 780 nm, the central circular portion transmits both laser beams. When reading DVDs, the luminous flux is not affected by the aperture control filter 103 to be entirely made incident on the objective lens 16 control and is converged onto the disk 18. When reading CDs, the luminous flux is affected by the aperture control filter 103 to pass through only at the central circular portion thereof to he partially made incident on the objective lens 16, which decreases the effective NA, and is converged onto the disk 18 with low aberration.

However, even with limitation of the aperture and decrease of the effective NA, spherical aberration still exists. Therefore, it is necessary to dispose the CD laser diode 12 closer to the collimating lens 13 for making the laser beam incident on the objective lens 16 with a slight divergence so that the spherical aberration can be cancelled. Accordingly, since the converging position of the light reflected at and returning from the disk 18 varies according to the distance between the laser diode 12 and the collimating lens 13, the distance with respect to the photo-detector 101 for CDs and the distance with respect to the photo-detector 102 for DVDs cannot be kept the same and thus two photo-detectors have to be provided. The two photo-detectors receive respective laser beams having a different wavelength from each other and separated by the wavelength selection prism 92.

FIG. 12 is a block diagram of a fourth conventional example, in which an integrated laser unit 201 for CDs and an integrated laser unit 202 for DVDs each including a laser diode and a photo-detector packaged into an enclosure are used and thus the number of components can be reduced in comparison with the third conventional example. The function of the integrated laser unit 201 and the integrated laser unit 202 is the same as that of the integrated laser units shown in FIG. 10 and thus the description thereof is omitted. The fourth conventional example has the same operation as the third conventional example shown in FIG. 11 and thus the description thereof is omitted.

The apparatuses shown as the first to fourth conventional examples have the following problems.

In the apparatus of the first conventional example, two laser diodes each adapted to emit a laser beam having a wavelength different from the other are required to ensure compatibility among DVDs, CDs, CD-R/RWs (CD recordable/rewritable), and also a means for introducing these two laser beams to the identical optical path is required.

In the apparatus of the second conventional example, there is a further problem that the integrated laser unit is costly thereby making cost reductions difficult.

In the apparatus of the third conventional example, the aperture control filter for compensating the phase difference between two different films is costly thereby making cost reduction difficult.

In the apparatus of the fourth conventional example, there is a problem in addition to the problem in the third conventional example that the integrated laser units are costly thereby making cost reduction difficult.

SUMMARY OF THE INVENTION

Accordingly, it is an object of the present invention to solve the above-described problems and provide an information reading and recording apparatus for recording media that is simple in construction and suitable for downsizing and reduction in thickness to read recording media such as DVDs, CDs, DC-R/RWs or the like, which have respective recording densities different from each other, only with a low-cost laser diode having a long oscillating wavelength. It is another object of the present invention to dispose a super-resolution cut-off filter immediately before an objective lens to enable reading of high-recording-density disks by the optical super-resolution effect. It is a further object of the present invention to provide a simple structure with a super-resolution cut-off filter provided with an optical film that does not require phase compensation and thus is formed at low cost.

In order to achieve the problems described above, an aspect of the present invention is an information reading and recording apparatus for recording media, comprising a semi-conductor laser, a photo-detector adapted to detect reflection light from two types of recording media having respective recording densities different from each other, a collimating lens adapted to convert a diffusion angle of a light beam from the semi-conductor laser, two objective lenses adapted to converge the light beam onto the two types of recording media, respectively, and having respective numerical apertures adapted for recording and reading of the respective recording media, and a super-resolution cut-off means disposed immediately before one of the two objective lenses adapted for one recording medium with a high density of the two types, wherein information is read and recorded in two types of recording media having respective recording densities different from each other.

In the information reading and recording apparatus for recording media, the two objective lenses and the super-resolution cut-off means may be integrated with means for switching between the two objective lenses and an actuator driving system enabling a position of the two objective lenses to be controlled with respect to a recording surface of the recording medium.

In the information reading and recording apparatus for recording media, the super-resolution cut-off means may be structured such that a dielectric multi-layer film is formed on a parallel-plate glass.

In the information reading and recording apparatus for recording media, super-resolution cut-off means may be structured such that a metallic film is formed on the parallel-plate glass.

BRIEF DESCRIPTION OF THE DRAWINGS

FIGS. 4A and 4B are drawings showing characteristics of the effect of the super-resolution cut-off filter according to the present invention, wherein FIG. 4A is a block diagram showing an arrangement for measurement, and FIG. 4B is a result of the measurement;

DESCRIPTION OF THE PREFERRED EMBODIMENTS

In the present invention, a semi-conductor laser and a filter having a super-resolution effect (super-resolution cut-off filter) disposed immediately before an objective lens adapted for a recording tedium with a high density, such as a DVD disk, are provided to enable reading of micro pit, information using only a laser diode (wavelength: 780 nm) for CDs.

The outline of the super-resolution cut-off filter used for the present invention will be described. The super-resolution cut-off filter is an optical filter for coherent light realized by the use of a technology called super-resolution. Super-resolution is a known technology specifically described in, for example, "Optical and Electro-Optical Engineering Contact" Vol. 33, No. 11 592–601 (1995), and thus the description will be omitted.

The resolution of optical equipment is related to the diameter of a light spot converged by an objective lens. As is well known, the main lobe diameter W of the convergent spot in paraxial approximation can be expressed as $W=1.22 \lambda/NA$, where $\lambda$ is the wavelength of light and NA is the numerical aperture. Since it is required that the main lobe diameter W be small for high resolution, the wavelength $\lambda$ has to be short and the numerical aperture NA has to be large.

FIGS. 5A to 5D are explanatory drawings illustrating the change in the main lobe diameter of convergent spots when the laser beam is converged. The value of the main lobe diameter W is called the diffraction-limited spot diameter, which is normally the minimum realizable spot diameter and exhibit the distribution shown in FIG. 5B when a laser beam 50 is incident on the objective lens 16 shown in FIG. 5A.

Figure 5A:
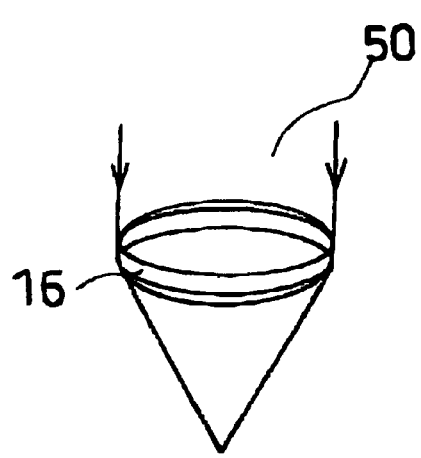
FIGS. 5A to 5D are explanatory drawings illustrating the change of the main lobe diameter of convergent spots when the laser beam is converged.
Figure 5C:
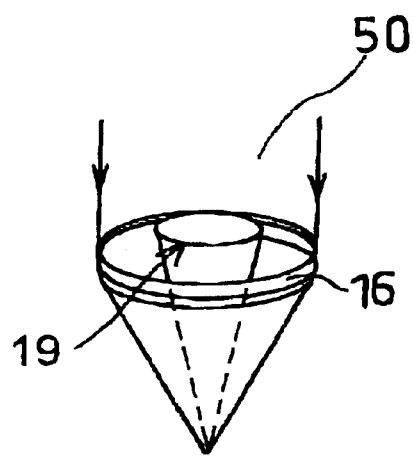
Figure 5B:
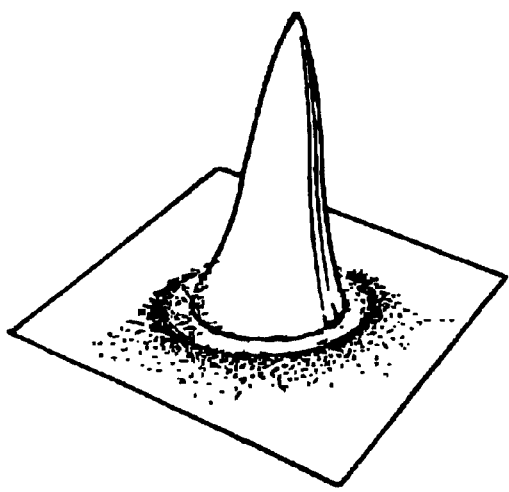
Figure 5D:
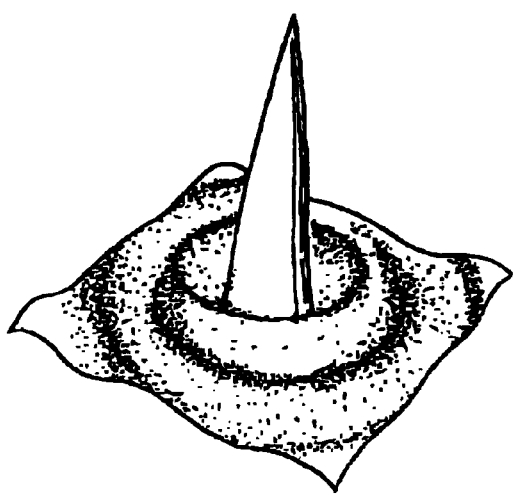
Figure 6:
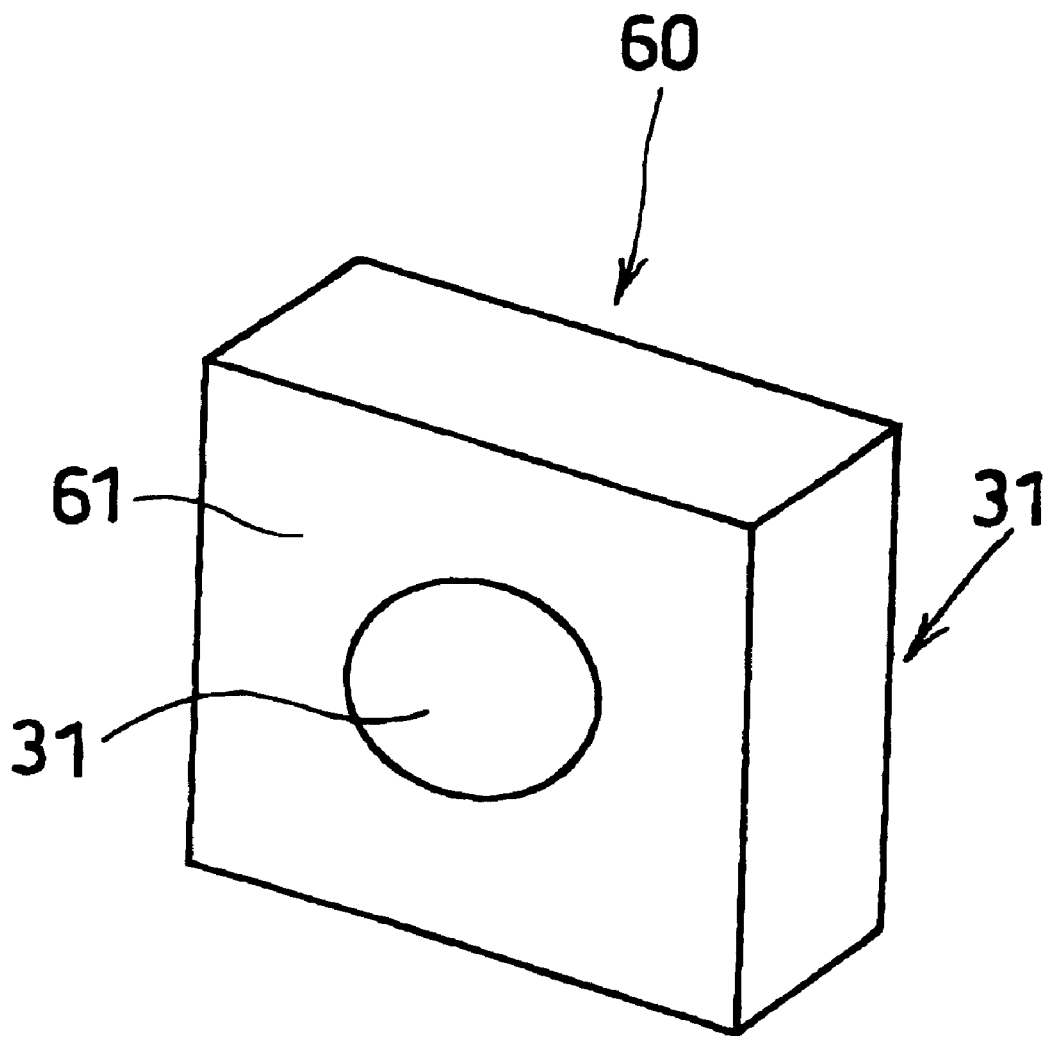
FIG. 6 is an explanatory drawing showing a conventional aperture control filter.
Figure 7:
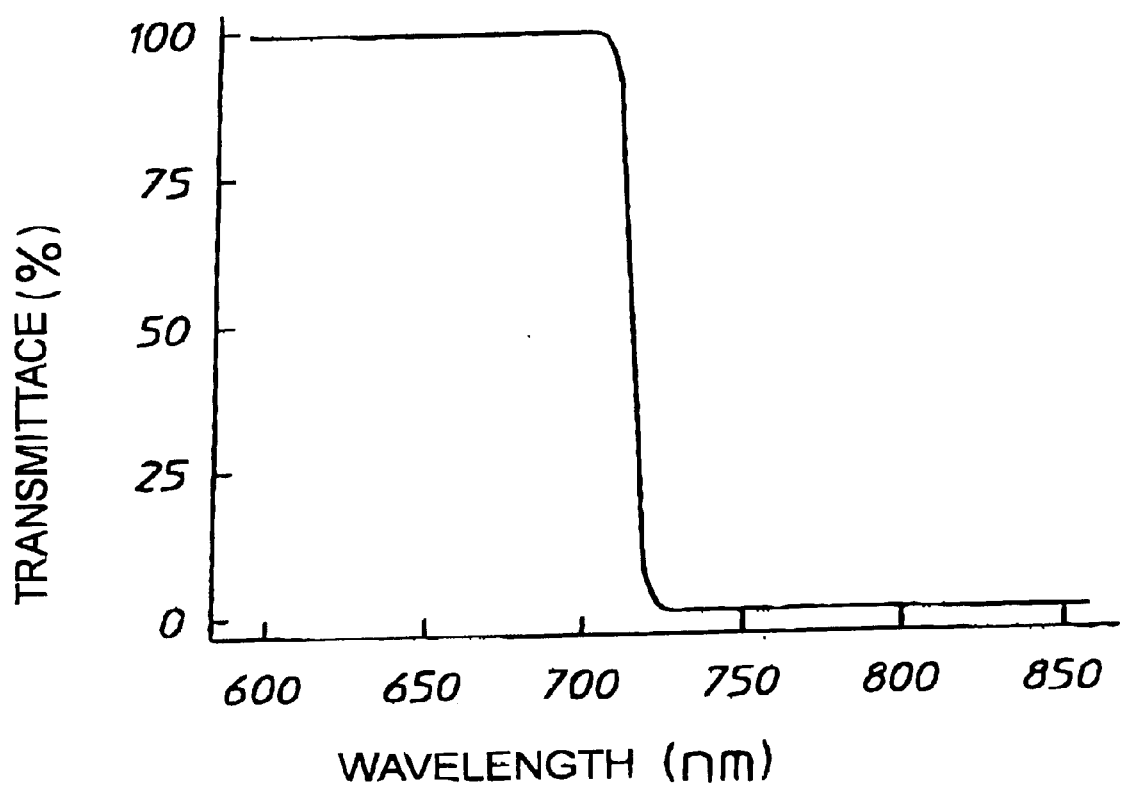
FIG. 7 is a graph showing the relationship between the wavelength and transmittance in a wavelength selection film used in a conventional aperture control filter.
Figure 8A:
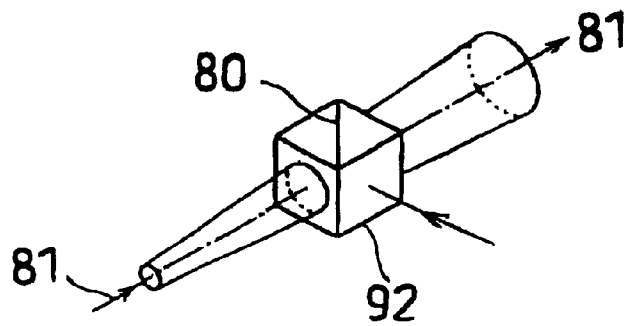
FIGS. 8A to 8C are explanatory drawings showing a conventional wavelength selection prism.
Figure 8B:
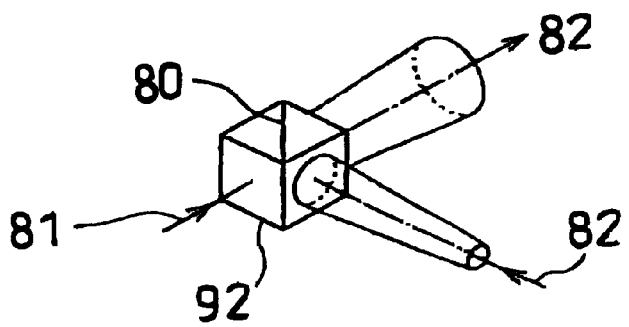
Figure 8C:
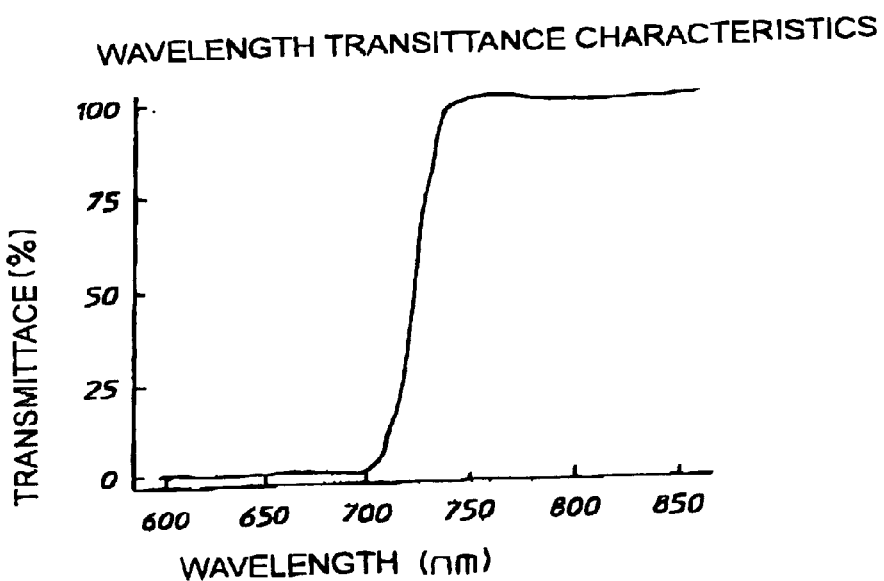
Figure 9:
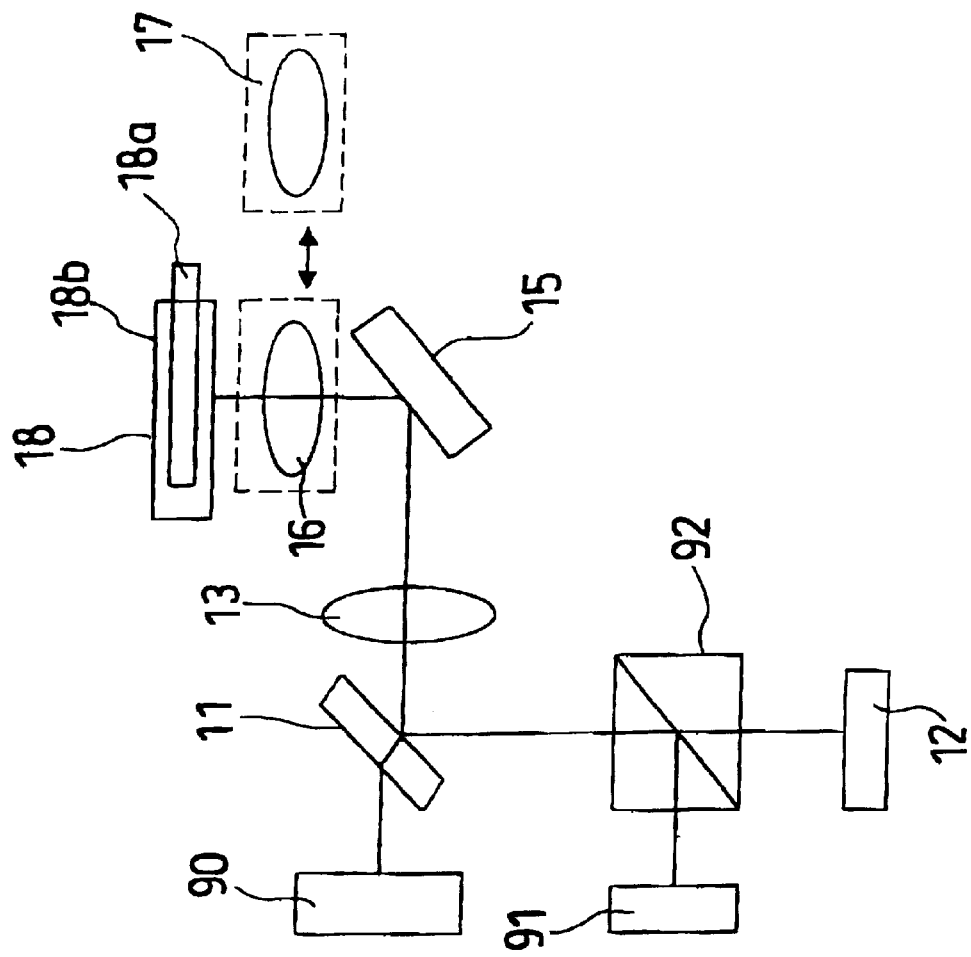
FIG. 9 is a block diagram of a first conventional example.
Figure 10:
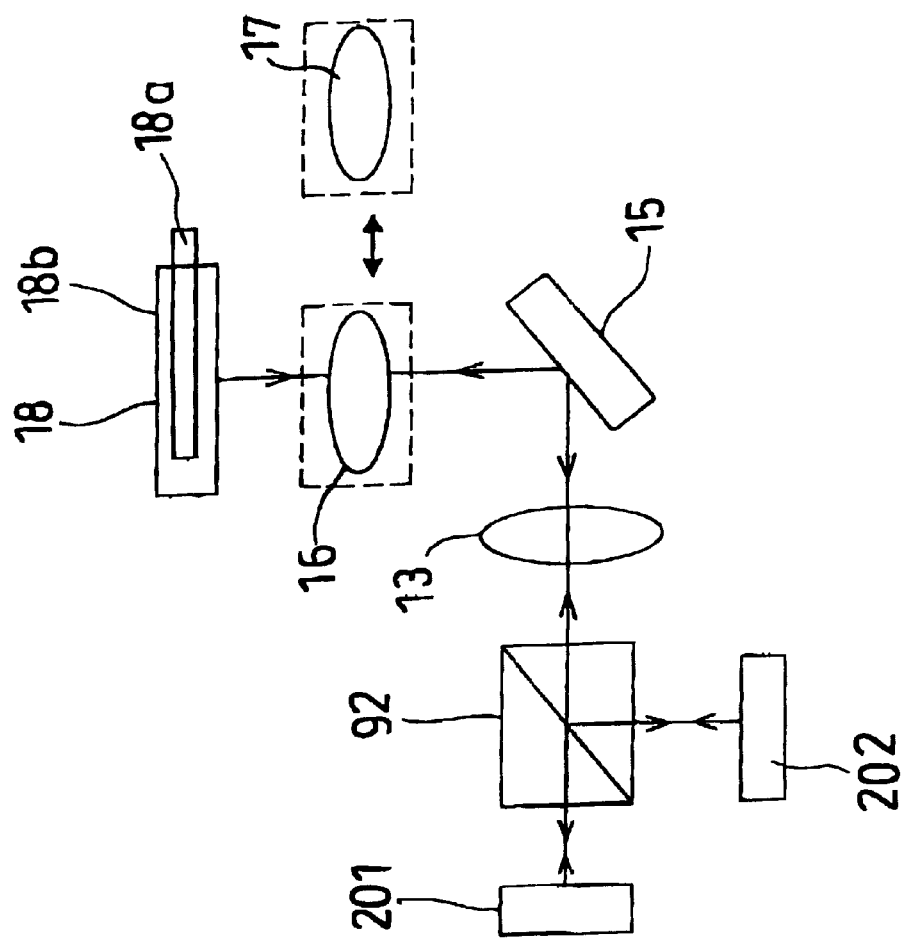
FIG. 10 is a block diagram of a second conventional example.
Figure 11:
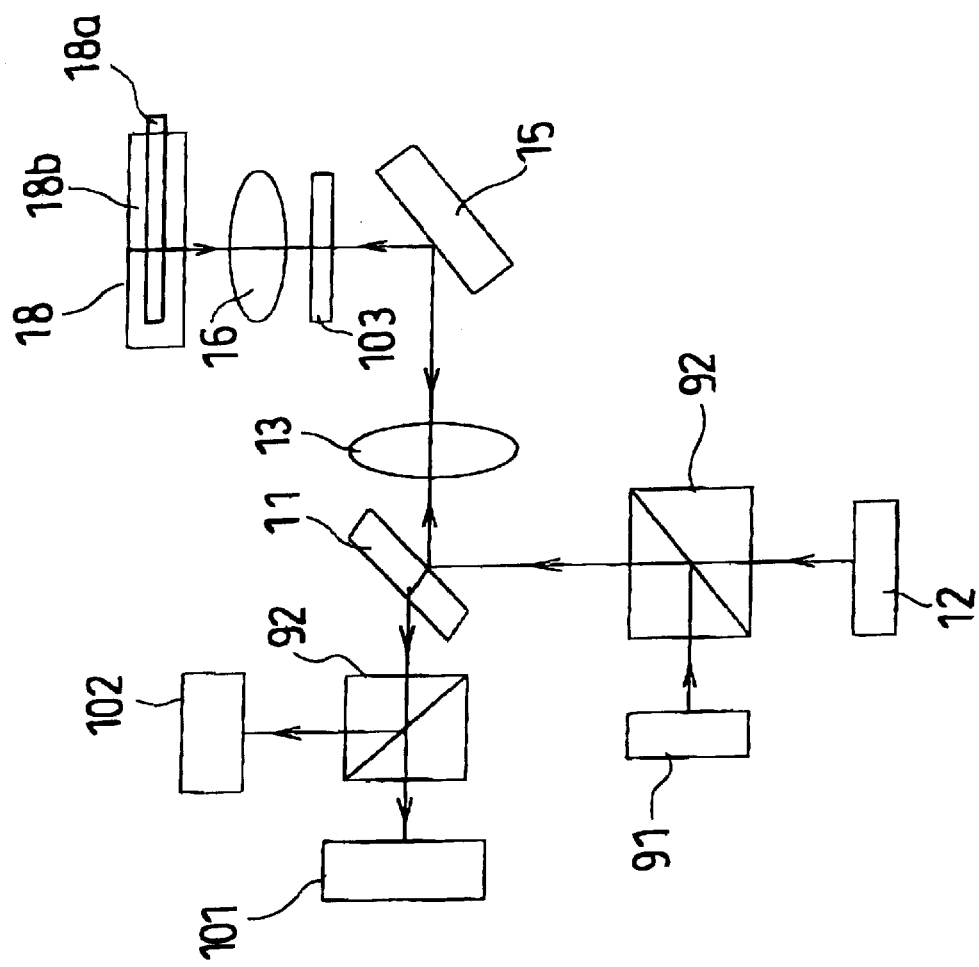
FIG. 11 is a block diagram of a third conventional example.
Figure 12:
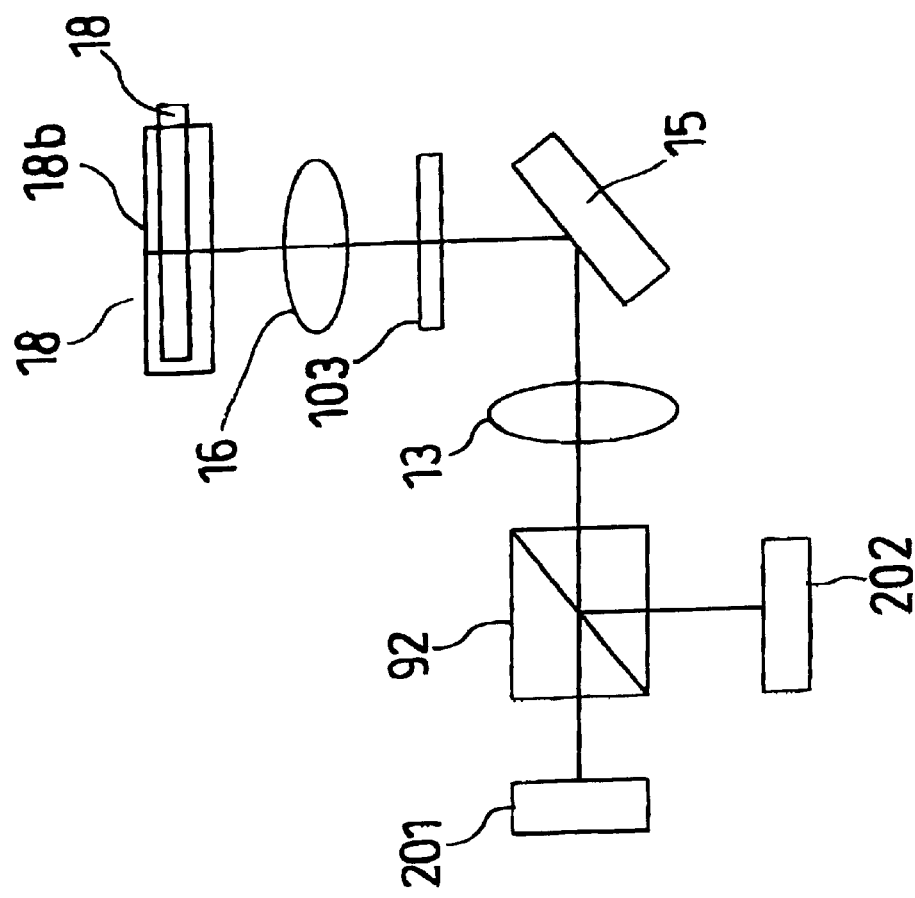
FIG. 12 is a block diagram of a fourth conventional example.

However, by providing a light-blocking plate 19 immediately before the objective lens 16 to change the amplitude distribution at the surface of lens aperture to be small in the inward portion and large at the outward portion, as shown in FIG. 5C, the main lobe diameter of the focal spot can be made smaller than the normal diffraction-limited value so that a distribution as shown in FIG. 5D is obtained.

Figure 3:
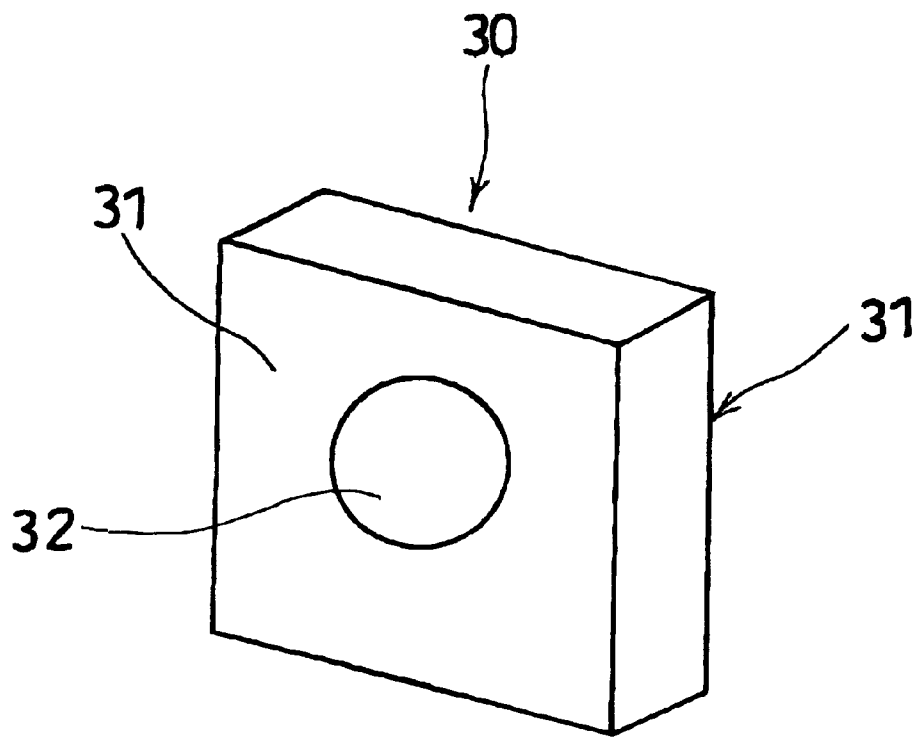
FIG. 3 is an explanatory drawing illustrating the structure of a super-resolution cut-off filter according to the present invention.

FIG. 3 is an explanatory drawing illustrating the structure of the super-resolution cut-off filter 10 described above. An anti-reflection film 31 formed of a multi-layer film is provided on the entire surface of one of the surfaces of a plate glass 30 and on the portion of the other surface other than the center portion, and a metal reflecting film 32 is provided on the central portion of the other surface other than the portion where the anti-reflection film 31 is provided.

Figure 4B:
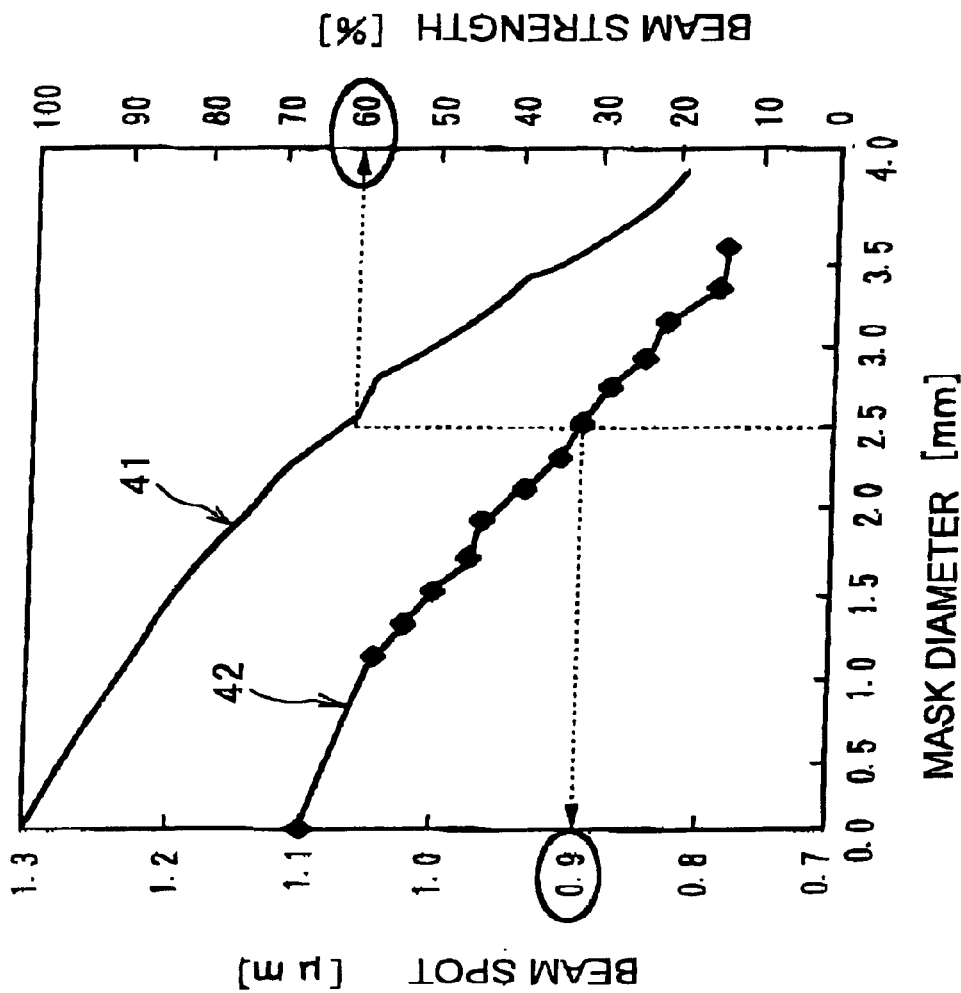
Figure 4A:
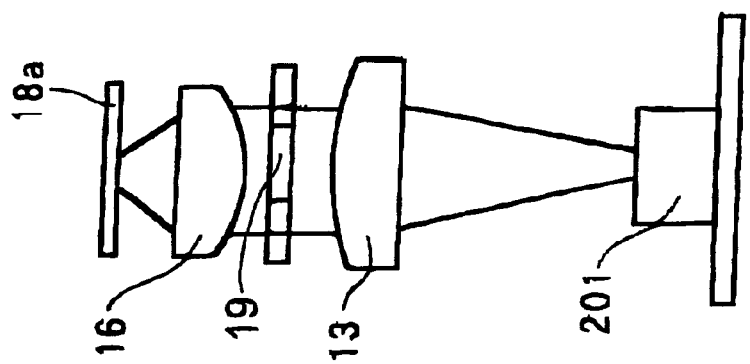

FIGS. 4A and 4B are drawings illustrating characteristics of the effect of the super-resolution cut-off filter 10 described above, wherein FIG. 4A is a block diagram showing an arrangement for measurement and FIG. 4B shows the results of the measurement. In FIG. 4A, an integrated laser unit 201 for CDs includes a semi-conductor laser for CDs with a wavelength of 780 nm and a photo-detector integrated therein as a single unit, and a lens of NA=0.6 is provided as an objective lens 16. The super-resolution cut-off filter is provided with the anti-reflection film 31 formed of a multi-layer film on the entire surface of one of the surfaces and the portion of the other surface other than the center portion of the plate glass 30 described in conjunction with FIG. 3, and the metal reflecting film 32 is provided on the center portion of the other surface other than the portion where the anti-reflection film 31 is provided as a super-resolution shielding plate 19.

The result obtained from the arrangement shown in FIG. 4A will be described by reference to FIG. 4B. In FIG. 4B, the abscissa represents the diameter of the super-resolution cut-off filter 10, the left vertical axis represents the spot diameter of the laser beam converged to the photo-detector in the integrated laser unit 201 for CDs, and the right vertical axis represents the strength of the laser beam. As is clear from the data 42 showing the change of the spot diameter of laser beam in FIG. 4B, the spot diameter of laser beam decreases with an increase of the diameter of the super-resolution cut-off filter 10. It can also be seen from the data 41 that the laser beam strength decreases with an increase of the diameter of the super-resolution cut-off filter 10.

It is seen that a spot diameter of about 0.9 $\mu$m is required for DVDs, and that the diameter of the super-resolution cut-off filter 10 should be 2.5 mm for obtaining the spot diameter of 0.9 $\mu$m. Though the strength of the laser beam at this time is decreased to 60%, the drive circuit (not shown) is used to adjust the strength of the laser beam source so that the strength of the semi-conductor laser required for recording and reading of the DVD is used for the diameter of the super-resolution cut-off filter 10 when it is used for the apparatus.

Figure 1:
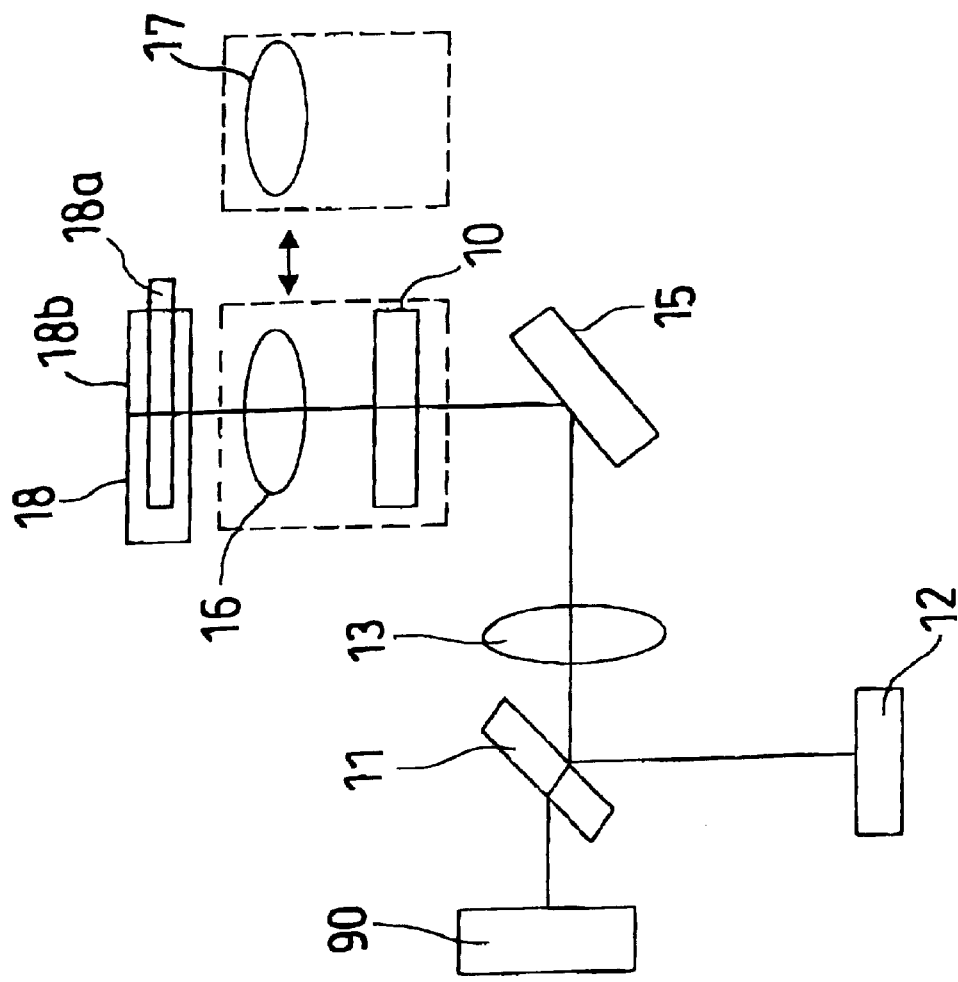
FIG. 1 is a block diagram of an embodiment of the present invention.

FIG. 1 is a block diagram of an embodiment of the present invention in which the super-resolution cut-off filter 10 described above is used. In FIG. 1, there are provided a CD laser diode 12 (wavelength: 780 nm) and a half mirror 11 as a beam splitter element adapted to introduce the laser beam to the collimating lens 13 and allow the laser beam reflected from the disk to pass through to the photo-detector 90 adapted for the wavelength of the CD laser diode or having the sensitivity for the wavelength of the CD laser diode. There is also provided a reflecting mirror 15 for introducing the laser beam passed through the collimating lens 13 to the objective lens 16 or 17 so that the laser beam is emitted from the objective lens to the disk 18. The disk 18 such as the DVD or the CD is placed on the drive mechanism (not shown) according to its use, and is rotated thereby.

The objective lens 16 is a lens with a high numerical aperture (high NA) for DVDs and the objective lens 17 is a lens with low numerical aperture (low NA) for CDs. There is provided a super-resolution cut-off filter 10 immediately before the objective lens 16. When the DVD is read, the objective lens 16 and the super-resolution cut-off filter 10 are disposed in the optical path. When the CD is read, the objective lens 17 is disposed in the optical path. The objective lens 16 and the super-resolution cut-off filter 10 for the DVD and the objective lens 17 for the CD can be switched by a lens switching means and a drive mechanism (not shown) integrated with the actuator driving system enabling a position of the two objective lenses to be controlled with respect to a recording surface of the recording medium.

The laser beam reflected from the disk 18 follows the same path in the opposite direction from the incoming route and passes through the half mirror 11 to be received by the photo-detector 90 to be converted into an electrical signal.

The function of the information reading and recording apparatus of the recording medium shown in FIG. 1 is described below. When it is used for DVD recording and reading, the laser beam from the CD laser diode 12 (wavelength: 780 nm) is reflected by the half mirror 11 and is incident on the collimating lens 13. The diffusion angle of the laser beam is changed, converted into a parallel pencil of rays, is redirected by the reflecting mirror 15, travels through the super-resolution cut-off filter 10, is changed in beam spot diameter into that described in conjunction with FIG. 4 above by the objective lens 16, and is incident on the recording surface of the DVD disk 18a.

The objective lens 16, together with the super-resolution cut-off filter 10, and the objective lens 17 are integrated with means for switching between the two objective lenses and an actuator driving system enabling a position of the two objective lenses to be controlled with respect to a recording surface of the recording medium, and are adapted to be operated with the objective lens 16 for the DVD and the super-resolution cut-off filter 10 selected in advance by a drive mechanism (not shown).

The laser beam reflected by the recording surface of the DVD disk 18a travels the same optical path in the opposite direction from the incoming route, and is incident through the objective lens 16 and the super-resolution cut-off filter 10 onto the reflecting mirror 15. The laser beam redirected by the reflecting mirror 15 is converged by the collimating lens 13, passes through the half mirror 11, and is incident on the photo-detector 90 to be converted into an electrical signal.

When recording a signal on the DVD, the strength of the laser beam is increased to the prescribed strength, and when reading information recorded therein, the strength of the laser beam is decreased to the prescribed strength. Such an adjustment is carried out by a control circuit (not shown) and a laser drive circuit (not shown).

When used for reading of the CD, the objective lens 16, together with the super-resolution cut-off filter 10, and the objective lens 17 are integrated with means for switching between the two objective lenses and an actuator driving system enabling a position of the two objective lenses to be controlled with respect to a recording surface of the recording medium, and are adapted to be operated with the objective lens 17 for CD selected in advance by the drive mechanism (not shown). The strength of the laser beam is also adjusted into the prescribed strength when reading information stored in the CD. Such an adjustment is carried out by a control circuit (not shown) and a laser drive circuit (not shown).

Figure 2:
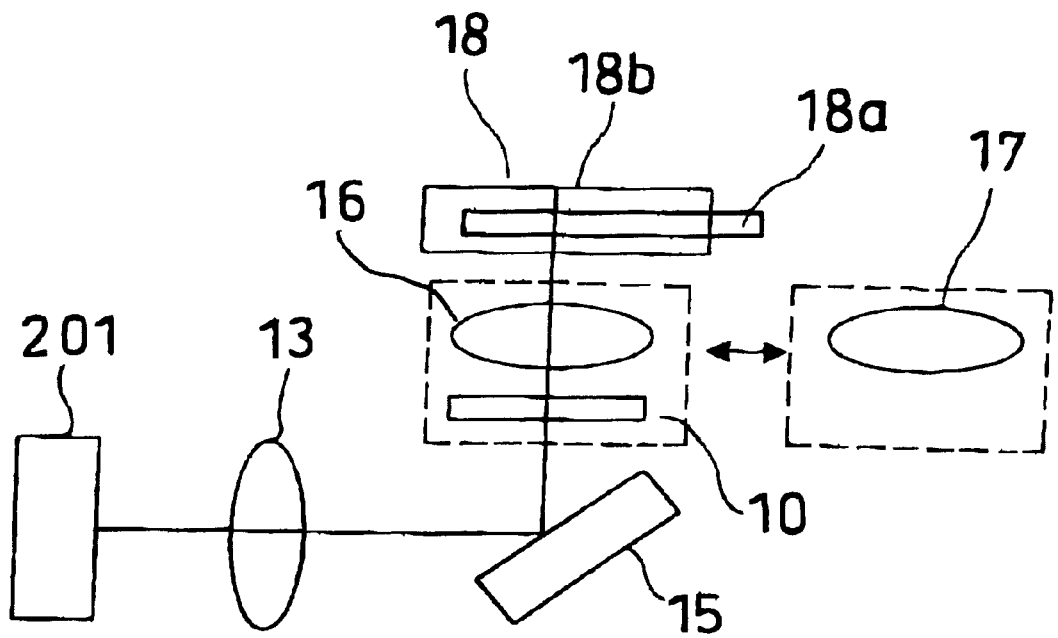
FIG. 2 is a block diagram of another embodiment of the present invention.

FIG. 2 is a block diagram of another embodiment of the present invention in which the super-resolution cut-off filter 10 described above is used. In FIG. 2, there are provided an integrated laser unit 201 for CDs including a semi-conductor laser for CDs and a photo-detector having the sensitivity for the wavelength of the semi-conductor laser packaged in one enclosure, a collimating lens 13 for converting the laser beam into a parallel pencil of rays, and a reflecting mirror 15 for introducing the laser beam passed through the collimating lens 13 to the objective lens 16 or 17 so that the laser beam is emitted from the objective lens to the disc 18.

Such objective lens 16 is a lens with a high numerical aperture (high NA) for DVDs and the objective lens 17 is a lens with a low numerical aperture (low NA) for CDs. There is provided a super-resolution cut-off filter 10 immediately before the objective lens 16. When reading DVDs, the objective lens 16 and the super-resolution cut-off filter 10 are disposed in the optical path. When reading CDs, the objective lens 17 is disposed in the optical path.

The objective lens 16, together with the super-resolution cut-off filter 10, and the objective lens 17 are integrated with means for switching between the two objective lenses and an actuator driving system enabling a position of the two objective lenses to be controlled with respect to a recording surface of the recording medium, and are adapted to be switched by the drive mechanism (not shown) between the objective lens for DVDs and the objective lens for CDs.

The integrated laser unit 201 for CDs includes the laser beam source with a wavelength of 780 nm appropriate for CDs and the photo-detector for CDs integrated as a single unit.

The function of the information reading and recording apparatus for recording media in FIG. 2 is the same as that shown in FIG. 1 except for the following points, and description is directed only to the different points and omitted for the common parts. The laser beam emitted from the integrated laser unit 201 for CDs is converted into a parallel pencil of rays by the collimating lens 13.

The laser beam passed through the collimating lens 13 is redirected by the reflecting mirror 15, as shown in FIG. 1. Such a laser bear travels through the super-resolution cut-off filter 10, is changed in beam spot diameter into that described in conjunction with FIGS. 4A and 4B above by the objective lens 16, and is incident on the recording surface of the DVD disk 18a.

The laser beam reflected on the recording surface of the DVD disk 18a travels the same optical path in the opposite direction from the incoming route, passes through the objective lens 16 and the super-resolution cut-off filter 10, and is incident on the reflecting mirror 15. The laser beam redirected by the reflecting mirror 5 is converged by the collimating lens 13, and is incident on the photo-detector 90 to be converted into an electrical signal.

As described above, the information reading and recording apparatus for recording media according to the present invention comprises a semi-conductor laser, a photo-detector adapted to detect reflection light from two types of recording media having respective recording densities different from each other, a collimating lens adapted to convert a diffusion angle of a light beam from the semi-conductor laser, two objective lenses adapted to converge the light beam onto the two types of recording media, respectively, and having respective numerical apertures appropriate to recording and reading of the corresponding recording medium, and a super-resolution cut-off means disposed immediately before one objective lens adapted for one recording medium with a high density, whereby information is read and recorded in two types of recording media having respective recording densities different from each other. Accordingly, recording media having respective recording densities different from each other, such as DVDs, CDs, and CD-R/RWs can be compatibly read only with a low-cost laser diode for low recording density.

In the information reading and recording apparatus, by integrating the two objective lenses and super-resolution cut-off means integrally with means for switching between the two objective lenses and an actuator driving system enabling a position of the two objective lenses to be controlled with respect to the recording surface of the recording medium, the merit in terms of cost can be enhanced by a simple construction.

In the information reading and recording apparatus, by structuring the super-resolution cut-off means in such a manner that a dielectric multi-layer film is formed on a parallel-plate glass, phase compensation is not required. Therefore, the formation of film can be made a low cost, and a simple structure is realized.

In the information reading and recording apparatus, by structuring the super-resolution cut-off means in a structure in which a metallic film is formed on a parallel-plate glass, phase compensation is not required. Therefore, the formation of film can be made at low cost, and a simple structure is realized.

What is claimed is:

1. An information reading and recording apparatus for recording media, comprising:
   a semi-conductor laser;
   a photo-detector adapted to detect reflection light from two types of recording media having respective recording densities different from each other;
   a collimating lens adapted to collimate a light beam from the semi-conductor laser;
   two objective lenses adapted to converge the light beam onto the two types of recording media, respectively, and having respective numerical apertures adapted for recording and reading of the respective recording media; and
   a super-resolution cut-off means disposed immediately before one of the two objective lenses adapted for one recording medium with a high density of the two types, the super-resolution cut-off means adapted to partly block the light beam thereby limiting a diameter of a focal spot,
   wherein the two objective lenses and the super-resolution cut-off means are integrated with means for switching between the two objective lenses and with an actuator driving system enabling a position of the two lenses to be controlled with respect to a recording surface of the recording medium, and
   whereby information is read and recorded in the two types of recording media having respective recording densities different from each other.

2. An information reading and recording apparatus for recording media according to claim 1, wherein the super-resolution cut-off means is structured such that a dielectric multi-layer film is formed on a parallel-plate glass.

3. An information reading and recording apparatus for recording media according to claim 1, wherein the super-resolution cut-off means is structured such that a metallic film is formed on a parallel-plate glass.

4. An information reading and recording apparatus for recording media according to claim 1, wherein the super-resolution cut-off means is structured such that a dielectric multi-layer film is formed on a parallel-plate glass.

5. An information reading and recording apparatus for recording media according to claim 1, wherein the super- resolution cut-off means is structured such that a metallic film is formed on a parallel-plate glass.

* * * * *